United States Patent Office 3,801,539
Patented Apr. 2, 1974

3,801,539
COBALT DICYCLOHEXYLDITHIOPHOSPHINATE STABILIZATION OF POLYOLEFINS
Houston George Brooks, Jr., Somerset, N.J., assignor to American Cyanamid Company, Stamford, Conn.
No Drawing. Original application Oct. 1, 1971, Ser. No. 185,877, now Patent No. 3,755,396, dated Aug. 28, 1973. Divided and this application Feb. 20, 1973, Ser. No. 334,188
Int. Cl. C08f 45/62
U.S. Cl. 260—45.75 R    3 Claims

ABSTRACT OF THE DISCLOSURE

A new compound, cobalt dicyclohexyldithiophosphinate, is disclosed. It is useful for stabilizing polyolefins against deterioration by light and heat.

---

This is a division of application Ser. No. 185,877 filed Oct. 1, 1971, now U.S. Pat. 3,755,396 issued Aug. 28, 1973.

This invention relates to stabilizing polyolefins, such as polyethylene and polypropylene, against deterioration by light and heat and is based upon the unexpected discovery that cobalt dicyclohexyldithiophosphinate is surprisingly much more effective for such purpose than closely related other metal salts.

Polyolefins such as poplyethylene and polypropylene tend to deteriorate from the effects of light and heat; such deterioration generally manifests itself as discoloration and brittleness or loss of tensile strength and flexibility of the polymer. Previous to the present invention, attempts to solve this problem have involved the incorporation of a light stabilizer or UV absorber as well as a heat stabilizer to preferentially shield the polymer from the damaging effects of the light and heat.

Individual additives which fulfill the role of stabilization against the effects of both light and heat are known. Thus, in Milionis et al., U.S. Pat. 3,293,208 and 3,409,654, metal salts of organic dithiophosphinic acids are used to stabilize polyolefins. These compounds generally afford substantial protection to polyolefins; the copper and zinc salts of dicyclohexyldithiophosphinic acid are generally preferred. However, there still exists a great need for improved stabilizers capable of conferring even greater heat and light stability to polyolefin compositions.

It has now been found that as a light and heat stabilizer for polyolefins, the cobalt salt of dicyclohexyldithiophosphinic acid is highly superior to other known metal salts of the substituted dithiophosphinic acids disclosed in said Milionis et al. patents. Its thermal stability is excellent for it can readily withstand a temperature of 360° F. such as is encountered in the milling of polypropylene. Without such thermal stability, the protective agent could not withstand these processing conditions. In addition to this excellent thermal stability, this compound affords extremely superior and prolonged protection against the action of light, particularly UV light, on polypropylene. Its ability to inhibit the embrittlement of this plastic on exposure is far superior to any of the other cationic salts of dicyclohexyldithiophosphinic acid disclosed in said Milionis et al. patents. In polyolefins, this compound is used in an amount effective to improve the stability of the polyolefin against the deteriorative effects of light and heat, preferably 0.01 to 5.0 weight percent being used.

It is an advantage that this stabilizer can be prepared by a method considered conventional. It is a further advantage that this stabilizer can be incorporated readily into plastics to be stabilized by mixing and milling means that are considered conventional by those skilled in the art. Furthermore such plastic compositions may contain also coloring agents, extenders, plasticizers, solvents, other stabilizers, etc.

It is most surprising that such excellent results are obtained with the compound of the invention in view of the fact that the other salts in general, while effective, are generally of a relatively lower order of activity.

The invention is further illustrated by the examples which follow.

EXAMPLE 1

Preparation of dicyclohexyldithiophosphinic acid

Under an atmosphere of nitrogen, a mixture of 50 ml. (0.75 mole) of 28% ammonium hydroxide, 50 ml. of water, and 13 gm. (0.407 mole) of powdered sulfur is heated to 60° C. with stirring. Then while the temperature is maintained between 60° and 65°, 39.6 gm. (0.2 mole) of dicyclohexylphosphine is added dropwise. Stirring is continued for 90 minutes while the temperature is maintained at 60° to 65° C. The reaction mixture is then filtered to remove the small amount of unreacted sulfur, and the filtrate acidified to methyl violet indicator paper with 5% sulfuric acid. The precipitated product is collected by filtration, washed with water and air dried to give 49.6 gm. of material, M.P. 99–101° C.

EXAMPLE 2

Preparation of cobalt dicyclohexyldithiophosphinate

To a mixture of 26.3 gm. (0.1 mole) of the product of Example 1 in 75 ml. of naphtha (Esso VM and P) heated to 80° is added a solution of 14.1 gm. (0.05 mole) cobaltous sulfate heptahydrate in 35 ml. of water. The mixture is refluxed for one hour and then cooled to 10° C. The greenish-blue product is collected by filtration and dried. Recrystallization from naphtha yields 21.9 gm. of product, melting point 206–207.5° C.

EXAMPLE 3

Evaluation in polypropylene

Effectiveness in polypropylene was determined by preparation of polypropylene compositions and exposure to ultraviolet light, the time of exposure before development of brittleness being determined. The procedure is described in more detail as follows.

Procedure

Fifty grams of polypropylene powder were placed in a screw-top jar along with the indicated amount of the compound to be tested. The blend was tumbled for 2 hours. This mixture was placed on a 6" x 13" mill whose rolls were heated to 360° F. and 320° F. respectively. This blend was passed through the nip of the rolls, stripped from the rolls and fed endwise into the nip to insure maximum mixing. This operation of stripping and passing through the nip was repeated ten times. From the sheet resulting from this blend, an 18-mil sheet was compression-molded. From this molded sheet, specimens were cut out for exposure in the Fade-O-Meter.

In the following table of results are shown the hours exposure in the Fade-O-Meter to reach the brittle point.

HOURS EXPOSURE REQUIRED TO REACH BRITTLE POINT IN POLYPROPYLENE

| Dicyclohexyldithiophosphinate salt | Percent concentration of additive | Hours of Fade-O-Meter exposure |
|---|---|---|
| Cobalt (II) | 0.20 | 3,400 |
| Copper (II) | 0.25 | 500 |
| Zinc | 0.20 | 600–700 |
| Cadmium | 0.20 | 700–800 |
| Nickel (II) | 0.25 | 1,300 |
| Ammonium | 0.20 | 300–400 |
| Manganese (II) | 0.25 | 500 |
| Lead (II) | 0.20 | 400–500 |
| Control | | 100 |

The above data illustrate the surprsingly high efficiency of Cobalt (II) dicyclohexyldithiophosphinate as a stabilizer for polypropylene resin.

I claim:

1. A polyolefin composition containing an amount of Cobalt (II) dicyclohexyldithiophosphinate effective to improve the stability of said polyolefin to the deteriorative effects of light and heat.

2. A composition as defined in claim 1 wherein said amount is between 0.01 and 5.0 percent by weight.

3. A composition as defined in claim 1 wherein said polyolefin is polyethylene or polypropylene.

References Cited

UNITED STATES PATENTS

| 3,293,208 | 12/1966 | Milionis et al. | 260—45.75 |
| 2,786,044 | 3/1957 | Warner et al. | 260—45.75 |
| 3,318,841 | 5/1967 | Tomlinson et al. | 260—45.75 |
| 3,218,293 | 11/1965 | Geigle | 260—45.75 |

OTHER REFERENCES

Chemistry & Industry, Feb. 16, 1963, pp. 271 to 281; article by G. Scott.

DONALD E. CZAJA, Primary Examiner

V. P. HOKE, Assistant Examiner

U.S. Cl. X.R.

260—45.75 C, 45. 75 N